United States Patent Office.

FRITZ BENDER, OF FRANKFORT-ON-THE-MAIN, GERMANY, ASSIGNOR TO FARBWERK MÜHLHEIM, OF MÜLHEIM, GERMANY.

PROCESS OF MAKING ACETYL-PHENYL-GLYCOCOL-ORTHO-CARBOXYLIC ACID.

SPECIFICATION forming part of Letters Patent No. 690,346, dated December 31, 1901.

Application filed February 19, 1901. Serial No. 47,996. (No specimens.)

*To all whom it may concern:*

Be it known that I, FRITZ BENDER, doctor of philosophy, a subject of the Grand Duke of Baden, residing at Frankfort-on-the-Main, Germany, have invented new and useful Improvements in the Manufacture of Acetyl-Phenyl-Glycocol-Ortho-Carboxylic Acid, of which the following is a specification.

Acetyl-phenyl-glycocol-ortho-carboxylic acid is of importance, because its esters can readily be converted into indigo coloring-matters. Hitherto it has only been prepared by the oxidation of acetyl-ortho-tolyl-glycocol. Attempts to obtain it by directly acetylating the acid were not successful. Thus Vorländer (see *Berichte*, Vol. 33, page 556) obtained brown amorphous substances upon treating phenyl-glycocol-ortho-carboxylic acid with acetic anhydrid or acetyl chlorid; but none of the desired acetyl derivatives could be obtained from these.

I have discovered that the desired acetyl compound can be obtained quantitatively by treating the acid itself with acetic anhydrid in neutral solution or in solution in the presence of sodium acetate or an excess of an alkali. The acetyl compound resulting remains in solution, but is precipitated on acidifying with a mineral acid.

The following examples will serve to illustrate the manner in which my invention may best be carried into practical effect; but the invention is not confined to the examples nor to the details given therein. The parts are by weight.

Example 1: Dissolve about two hundred and forty (240) parts of the neutral sodium salt of phenyl-glycocol-ortho-carboxylic acid in one thousand (1,000) parts of water. Stir the solution thoroughly and keep it cool while running in one hundred and twenty (120) parts of acetic anhydrid. Then allow the mixture to stand for about an hour at ordinary temperature and precipitate the resulting acetyl compound by adding two hundred and fifty (250) parts of dilute sulfuric acid, containing fifty (50) per cent. $H_2SO_4$. Collect in the usual way.

Example 2: Dissolve about one hundred and ninety-five (195) parts of phenyl-glycocol-ortho-carboxylic acid and one hundred and seventy (170) parts of calcined soda in one thousand (1,000) parts of water. Keep the solution well cooled and thoroughly agitated while adding one hundred and twenty (120) parts of acetic anhydrid. This reagent soon disappears. Precipitate the resulting acetyl product by adding dilute sulfuric acid. Collect in the usual way.

Example 3: Dissolve two hundred and forty (240) parts of the neutral sodium salt of phenyl-glycocol-ortho-carboxylic acid and one hundred and fifty (150) parts of sodium acetate in one thousand (1,000) parts of water. Keep the solution thoroughly cool and add one hundred and twenty (120) parts of acetic anhydrid. The desired acetyl product can be obtained from the solution thus obtained in a manner similar to that set forth in Example 1.

What I claim is—

1. The process for the manufacture of acetyl-phenyl-glycocol-ortho-carboxylic acid which consists in treating an aqueous solution of a salt of phenyl-glycocol-ortho-carboxylic acid with acetic anhydrid, substantially as described.

2. The process for the manufacture of acetyl-phenyl-glycocol-ortho-carboxylic acid which consists in treating an aqueous solution of a salt of phenyl-glycocol-ortho-carboxylic acid with acetic anhydrid in the presence of a salt which can act as an alkali, substantially as described.

In testimony whereof I have hereunto set my hand in the presence of two subscribing witnesses.

FRITZ BENDER.

Witnesses:
JEAN GRUND,
CARL GRUND.